United States Patent [19]

Neff et al.

[11] Patent Number: 4,861,499

[45] Date of Patent: Aug. 29, 1989

[54] WATER-DISPERSIBLE HYDROPHOBIC THICKENING AGENT

[75] Inventors: Roger E. Neff, Stamford; Roderick G. Ryles, Milford, both of Conn.

[73] Assignee: American Cyanamid Company, Stamford, Conn.

[21] Appl. No.: 107,819

[22] Filed: Oct. 13, 1987

[51] Int. Cl.[4] .......................... C09K 7/02; C09K 7/06; E21B 43/26; F17D 1/16
[52] U.S. Cl. .................. 252/8.551; 252/8.51; 252/8.514; 252/8.554; 524/547; 524/548; 524/555
[58] Field of Search ...................... 524/547, 555, 548; 252/8.51, 8.514, 8.551, 8.554

[56] References Cited

U.S. PATENT DOCUMENTS

| 3,900,069 | 8/1975 | Sarem | 252/8.554 |
|---|---|---|---|
| 4,301,016 | 11/1981 | Carriere et al. | 252/8.51 |
| 4,432,881 | 2/1984 | Evani | 524/555 |
| 4,542,175 | 9/1985 | Fink et al. | 524/555 X |
| 4,554,081 | 11/1985 | Borchardt et al. | 252/8.551 |
| 4,563,290 | 1/1986 | Okada et al. | 252/8.554 |
| 4,652,621 | 3/1987 | Kadono et al. | 252/8.551 X |
| 4,653,584 | 3/1987 | Ball et al. | 252/8.551 X |
| 4,669,920 | 6/1987 | Dymond | 252/8.551 X |
| 4,728,696 | 3/1988 | Van Phung et al. | 252/8.551 |

Primary Examiner—John F. Terapane
Assistant Examiner—Gary Geist
Attorney, Agent, or Firm—Frank M. Van Riet

[57] ABSTRACT

An aqueous liquid medium having increased low shear viscosity is provided by dispersing into the aqueous medium (1) a water-soluble polymer having pendant hydrophobic groups, e.g, an acrylamide/dodecyl acrylate/acrylic acid terpolymer. The thickened aqueous medium is suitably employed in applications requiring viscous liquids which retain their viscosity when subjected to shear, heat or high electrolyte (salt) concentrations. Such applications include uses in enhanced oil recovery processes, as fluid mobility control agents, fracturing fluids and drilling muds, as well as hydraulic fluids and lubricants.

9 Claims, No Drawings

WATER-DISPERSIBLE HYDROPHOBIC THICKENING AGENT

BACKGROUND OF THE INVENTION

This invention relates to thickening agents containing water-dispersible polymers which agents are used to increase the viscosity of aqueous media.

U.S. Pat. No. 4432881 discloses a thickening agent which comprises a water-soluble polymer having pendant hydrophobic groups and a water-dispersible surfactant having hydrophobic groups that are capable of associating with the hydrophobic groups of the polymer. The patentee indicates that the relative proportions of the two components of the thickening agent are such that, when the thickening agent is dispersed in water in a concentration of 0.5 weight percent based on the water, the viscosity of the water is at least doubled, the thickening agent being such that the water can be subjected to mechanical shear without significant loss of viscosity. Additionally, the thickening agents are said to be such that their viscosity is not reduced by the presence of electrolytes such as sodium chloride etc.

The copolymers disclosed as useful in the above-mentioned patent for the production of the thickening agents thereof comprise a copolymer of a water-soluble monomer such as acrylamide and a hydrophobic group-containing comonomer such as dodecyl acrylate or methacrylate. The patentee indicates that such copolymers, when used in conjunction with a hydrophobic group containing surfactant, result in thickening agents which increase the viscosity of water when added thereto.

The use of the surfactants has been found to be unnecessary by Applicants in that their necessity has been shown to be obviated by the use of a third monomer, i.e, a water-soluble monomer which when copolymerized with the other two monomers results in the formation of a water-soluble terpolymer. It was discovered that the copolymers of U.S. 4432881, when produced at certain high molecular weights, are water-insoluble as such and do not function as described therein even when a surfactant is present in amounts specified. Thus, the copolymers of said patent are actually limited to those having molecular weights such that they are water-soluble.

Applicants have discovered that useful thickening agents containing polymers having very high molecular weights, i.e, up to about 10 million can be produced in the absence of the surfactant indicated as essential by the patentees of U.S. 4432881. Thus, thickening agents containing polymers having very high molecular weights can be utilized, which polymers, when produced according to U.S. 4432881, do not function as described therein. The agents exhibit thermal stability, electrolytic tolerance and good resistance to shear.

SUMMARY OF THE INVENTION

The present invention is directed to a thickening agent which consists essentially of a water-soluble polymer having pendant hydrophobic groups and a water-soluble inorganic salt. When the thickening agent is dispersed in water, the viscosity of the water is substantially increased. Media containing the thickening agents of this invention can be subjected to substantial mechanical shear without significant loss of viscosity. The substantial viscosity increase is evidenced even when the aqueous media to which it is added contains significant concentrations of electrolyte such as in the case of hard water or brine. Consequently, the thickening agents hereof can be used for a variety of applications wherein high temperatures, substantial electrolyte concentrations and conditions of high mechanical shear, such as in high shear pumping of the aqueous medium, is required. The instant thickening agents are useful in all applications which require aqueous media having increased vicosity such as drilling mud formulations, fracturing fluids, fluid mobility control agents, aqueous solutions of inorganic salts, hydraulic fluids, lubricants, friction reducing agents, suspending agents, aqueous suspension of insoluble particulates such as paint formulations and the like.

The present invention also pertains to aqueous media containing an amount of the thickening agent hereof which is effective to increase the viscosity of the media.

In a preferred embodiment of the invention, the aqueous medium containing the thickening agent is a mobility control fluid useful in enhanced oil recovery operations. In the practice of this embodiment of the invention, the thickened aqueous medium is introduced through an injection well into a porous subterranean formation penetrated by said well and driven through the formulation through the producing well.

In further aspects of this invention, the thickening agent is employed in a drilling mud formulation or a fracturing fluid wherein the thickening agent is present in an amount sufficient to increase the viscosity of the formulation or fluid as desired.

DETAILED DESCRIPTION OF THE INVENTION INCLUDING PREFERRED EMBODIMENTS

The instant invention is directed to a water-soluble composition for thickening aqueous liquids consisting essentially of:

(A) a water-soluble thickening agent which agent consists essentially of:
a water-soluble polymer having pendant hydrophobic groups, said polymer being a terpolymer of two water-soluble ethylenically unsaturated monomers and a water-insoluble ethylenically unsaturated monomer having a hydrophobic group having at least 8 carbon atoms wherein,
(a) one water-soluble monomer is an ethylenically unsaturated amide,
(b) the other water-soluble monomer is an N-substituted derivative of an ethylenically unsaturated amide, an ethylenically unsaturated carboxylic acid, an ethylenically unsaturated quaternary salt, a sulfoalkyl ester of an unsaturated carboxylic acid, an aminoalky ester of an unsaturated carboxylic acid, a diallylamine, a diallylammonium compound or a vinylaryl sulfonate and,
(c) the water-insoluble monomer is a higher alkyl ester of an α,β-ethylenically unsaturated carboxylic acid, an alkylaryl ester of an ethylenically unsaturated carboxylic acid, an N-alkyl ethylenically unsaturated amide, a vinyl alkyl ether or an an-alkyl styrene and,
(B) a water-soluble inorganic salt,
wherein the molecular weight of the terpolymer is such that, at the same concentration, a copolymer of only components (a) and (c) having the same molecular weight, is water-insoluble, the concentration of monomer (b) being replaced by an equal concentration of monomer (a).

For the purposes of this invention, the water-soluble polymer is one which forms the thermodynamically stable mixture when combined with water. These mixtures form spontaneously and include true solutions in which the individual polymer molecules are dispersed as well as micellular or colloidal solutions wherein the polymer molecules are aggregated to some extent, but wherein such aggregates are no larger than colloidal size.

The molecular weight of the water-soluble polymer is low enough such that an aqueous medium containing 0.1 weight percent of the polymer can be subjected to degree of shear on the order of 10,000 sec$^{-1}$ without causing the polymer to degrade significantly. Moreover, the polymer has a molecular weight such that, when 0.5 weight part of the polymer is dissolved in 100 weight parts of water, the Brookfield viscosity of the water is increased to at least 2 centiposes (as measured using a Brookfield LVT viscometer equipped with UL adaptor and operated at 6 rpm and 25° C.). Preferably, the water-soluble polymers used in this invention have molecular weights ($M_w$), as determined by intrinisic viscosity measurements, in the range from about 2 to about 20 million, most preferably from about 5 to about 15 million.

The pendant hydrophobic groups of the water-soluble polymer are organic groups having hydrophobicities comparable to one of the following: aliphatic hydrocarbon groups having at least four carbons such as $C_4$ to $C_{20}$ alkyls and cycloalkyls; polynuclear aromatic hydrocarbon groups such as naphthyls; alkylaryls wherein alkyl has one or more carbons; haloalkyls of four or more carbons, preferably perfluoroalkyls; polyalkyleneoxy groups wherein the alkylene is propylene or higher alkylene and there is at least 1 alkyleneoxy nit per hydrophobic moiety. The concentration of hydrophobic moieties in the water-soluble polymer is that which is sufficient to increase the viscosity of an aqueous medium. Preferably, the concentration of hydrophobic groups in the polymer is such that, when one weight part of the polymer is dissolved in 100 weight parts of the aqueous medium, the Brookfield viscosity of the aqueous medium is twice that of an aqueous medium containing 1 weight percent of a hydrophillic polymer that is identical in all respects to the hydrophobic polymer except that the hydrophillic polymer contains no hydrophobic groups. For example, if an aqueous solution containing 1 weight percent of a copolymer of acrylamide and acrylic acid (hydrophillic polymer) has a Brookfield viscosity of 10 cps, the aqueous solution containing 1 weight percent of a suitable hydrophobic terpolymer, e.g., an acrylamide/acrylic acid/dodecyl acrylate terpolymer having $M_w$ equivalent to the acrylamide copolymer, will have a Brookfield viscosity of at least 20 cps.

Exemplary water-soluble polymers include the terpolymers of water-soluble ethylenically unsaturated monomers with hydrophobic ethylenically unsaturated monomers wherein the concentration of hydrophobic monomer is sufficient to provide the requisite concentration of hydrophobic moieties. Preferably, the water-soluble polymer is a terpolymer from about 9% to about 99.995 mole percent of the combined monomers (a) and (b), described above, with from about 0.005 to 2 mole percent of one or more hydrophobic monomers. For the water-soluble terpolymers, it is found that preferred amounts of hydrophobic monomers will vary with the molecular weight of the polymer. For example, a water-soluble terpolymer having a molecular weight near 2 million, preferably contains from about 1 to about 2 mole percent of hydrophobic monomer. Alternatively, the water-soluble polymer having a molecular weight of 15 million preferably contains form about 0.05 to about 0.25 mole percent of hydrophobic monomer.

Suitable water-soluble monomers include those which are sufficiently water-soluble to form at least a 10 weight percent solution when dissolved in water and readily undergo addition polymerization to form polymers which are water-soluble. Exemplary water-soluble monomers identified as a), above, include ethylenically unsaturated amides such acrylamide, methacrylamide and fumaramide.

Suitable water-soluble monomers which are identified as (b), above, include N-substituted derivatives of an ethylenically unsaturated amide such as 2-acrylamide-2-methylpropane sulfonic acid N-(dimethylaminomethyl)acrylamide as well as N-(trimethylammoniummethyl)acrylamide chloride and N-(trimethylammoniumpropyl)methacrylamide chloride; ethylenically unsaturated carboxylic acids such as acrylic acid, methacrylic acid, itaconic acid and fumaric acid. Ethylenically unsaturated quaternary compounds such as dimethylaminoethylacrylate methyl chloride salt, vinylbenzyl trimethyl ammonium chloride, sulfoalkyl esters of unsaturated carboxylic acids such as 2-sulfoalkyl methacrylate; aminoalkyl esters of unsaturated carboxylic acids such as 2-aminoethyl methacrylate; vinyl amines such as vinyl pyridine and vinyl morpholine, diallyl amines and diallyl ammonium compounds such as diallyl dimethyl ammonium chloride; vinyl heterocyclic amides such as vinyl pyrolidone; vinylaryl sulfonates such as vinylbenzyl sulfonate as well as the salts of the foregoing monomers. Of the foregoing (a) and (b) water-soluble monomers, combinations of acrylamide and acrylic acid are preferred. Acrylamide and combinations thereof with up to 75 mole percent of acrylic acid, based on total water-soluble monomer, are more preferred. Most preferred are polymers wherein the water-soluble monomer is a mixture of acrylamide with from about 5 to about 50 mole percent, especially from about 15 to about 30 mole percent, of acrylic acid.

Suitable hydrophobic monomers (c) are those which are water-insoluble, i.e, less than 0.2 weight part of the hydrophobic monomer will dissolve in 100 weight parts water. Exemplary hydrophobic monomers include the higher alkyl ester of $\alpha,\beta$-ethylenically unsaturated carboxylic acids such as dodecyl acrylate, dodecyl methacrylate, tridecyl acrylate, tridecyl methacrylate, tetradecyl acrylate, tetradecyl methacrylate, octadecyl acrylate, octadecyl methacrylate, the ethyl half ester of maleic anhydride, diethyl maleate, and other alkyl esters derived from the reactions of alkanols having from 8 to 20 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-o-phenyl acrylate, nonyl-$\alpha$-phenyl methacrylate, dodecyl-$\alpha$-phenyl acrylate and dodecyl-$\alpha$-phenyl methacrylate; N-alkyl, ethylenically unsaturated amides such as N-octadecyl acrylamide, N-octadecyl methacrylamide, N,N-dioctyl acrylamide and similar derivatives thereof; $\alpha$-olefins such as 1-octene, 1-decene, 1-dodecene and 1-hexadecene; vinyl alkylates wherein alkyl has at least 8 carbons such as vinyl laurate and vinyl stearate; vinyl alkyl ethers such as dodecyl vinyl ether and hexadecyl vinyl ether; N- vinyl amides such as N-vinyl lauramide and N-vinyl stearamide; and ar-alkylstyrenes such as t-butyl styrene. Of the foregoing hydrophobic monomers, the alkyl esters of acrylic acid and methacrylic acid wherein the alkyl has from 8 to 20 carbon atoms are preferred. The alkyl acrylates wherein the alkyl has from 10 to 20 carbon atoms are more preferred. Dodecyl acrylate is the most preferred.

The aforementioned water-soluble terpolymers containing hydrophobic moieties are advantageously prepared by polymerizing the water-soluble monomers with the hydrophobic monomers by any conventional polymerization technique wherein the hydrophobic monomer or mixture of hydrophobic monomers is added with vigorous agitation to an aqueous solution of the mixture of water-soluble monomers. In the instances wherein the water-soluble monomers, as well as the hydrophobic monomer, are soluble in a neutral organic solvent, the water-soluble polymer can be prepared by any desired solution polymerization method wherein the neutral organic solvent is employed as the polymerization diluent. The most effective water-soluble terpolymers are prepared by copolymerizing the water-soluble monomers with the hydrophobic monomer in a molar ratio of water-soluble monomers: hydrophobic monomer in the range from about 98:2 to about 99.995:0.005, preferably from about 99:1 to about 99.9:0.1.

Polymerization of the water-soluble and hydrophobic monomers is advantageously effected in an aqueous medium containing an emulsifier for the hydrophobic monomer and a polymerization initiator capable of generating free-radicals. The emulsifier is required in most instances to suitably disperse the hydrophobic monomer and to subsequently obtain a terpolymer having a uniform composition. Optionally a chain-transfer agent may be included in the polymerization reaction mixture. Accordingly, it is desirable to employ from about 0.01 to about 0.1 weight percent of initiator, based on the monomers, and from about 0.1 to about 1 weight percent of emulsifier, based on the monomers.

Exemplary suitable polymerization initiators include the inorganic persulfates such as potassium persulfate, ammonium persulfate and sodium persulfate; azo catalysts such as azobisisobutyronitrile and dimethyl azoisobutyrate; organic peroxygen compounds such as benzyl peroxide, t-butyl peroxide, diisopropyl benzenehydroperoxide and t-butyl hydroperoxide.

Suitable emulsifiers include anionic agents such as alkali metal salts of alkyl sulfates and alkyl and aryl sulfates, e.g, dodecyl alkyl sulfosuccinates and sodium dodecylbenzene sulfate; fatty acid soaps, e.g., sodium oleate, sodium stearate and potassium oleate; alkali metal salts of sulfonated fatty alcohols, e.g, sodium dodecyl sulfate; sulfates of ethoxylated alcohols; alkyl phosphate esters, e.g., dodecyl hydrogen phosphate; fluoro emulsifiers, e.g., perfluoroalkyl sulfates; and the like. Also included are cationic emulsifiers such as alkylamine hydrochlorides, e.g., dodecylamine hydrochloride and tridecylamine hydrochloride; quaternary alkyl or aryl ammonium halides such as dodecyl trimethyl ammonium chloride; ethoxylated fatty amines and other emulsifiers as described in McCutcheon'Detergents and Emulsifiers, North American Edition, 1987 Annual. In general, when the water-soluble polymer is anionic or nonionic, an anionic emulsifier such as an alkali metal alkyl sulfate is preferably employed as the emulsifier. When the water-soluble polymer is cationic, a cationic emulsifier such as dodecylamine hydrochloride is employed. When the water-soluble polymer is nonionic, anionic or cationic, a nonionic emulsifier such as nonylphenoxy polyethylene glycol having 10 ethyleneoxy units per molecule is suitably employed.

The water-soluble terpolymers are readily recovered from the aqueous medium when such is desired by removal of water under vacuum or by azeotropic distillation. Alternatively, such terpolymers may be separated by the addition of methanol or anhydrous acetone to cause the water-soluble terpolymer to form a phase separate from the aqueous medium. As a further alternative, the aqueous medium containing the water-soluble terpolymer can be used as such.

It is also understood that water-soluble terpolymers of acrylamide, acrylic acid and hydrophobic monomer can be prepared by copolymerizing all three of these monomers or by copolymerizing acrylamide with the hydrophobic monomer and subsequently hydrolyzing a portion of the copolymerized acrylamide by contacting the copolymer with a base such as sodium hydroxide and/or sodium carbonate.

The thickening agent of the present invention is advantageously prepared by dispersing the water-soluble terpolymer in an aqueous medium under conditions such that it is uniformly distributed throughout the aqueous medium.

The amount of total thickening agent in the aqueous medium being thickened is sufficient to provide the desired increase in viscosity of the aqueous medium. Preferably, such amounts of thickening agent range from about 0.025 to about 5 weight percent, most preferably from about 0.5 to about 2.5 weight percent, based on the aqueous medium. In addition, to the thickening agent, the aqueous medium may contain a variety of other ingredients common to brines, fracturing fluids, drilling muds, paint formulations, lubricants, friction-reducing agents, suspending agents, liquid mobility control agents, hydraulic fluids and the like.

Of particular interest are the brines and other aqueous media containing salts of various metals. Such aqueous media often contain from about 0.01 to about 20 weight percent of salts of alkali metals and alkaline earth metals.

To increase the viscosity of an aqueous medium containing substantial amounts, e.g., up to about 5 weight percent, based on the aqueous medium, of monovalent inorganic salts such as sodium chloride and up to 1 weight percent, usually from 0.0015 to 0.5 weight percent, of salts of polyvalent cations such as calcium and magnesium, it is preferred to employ as the water-soluble terpolymer, a nonionic terpolymer of acrylamide, acrylic acid and a higher alkyl acrylate or methacrylate such as dodecyl methacrylate. The viscosity increase in this aqueous medium is retained at temperatures over the range from about 30° C. to about 80° C. In many instances, this viscosity increase is retained at temperatures substantially higher than 80° C.

The following examples are set forth for purposes of illustration only and are not to be construed as limitations on the present invention except as set forth in the appended claims. All parts and percentages are by weight unless otherwise indicated.

EXAMPLES 1 (Comparative)

A solution containing 74.93 parts of 50% acrylamide, 7.5 parts of sodium dodecyl sulfate, 0.225 part (0.1 mole % on acrylamide) of lauryl acrylate, 7.5 parts of a solution containing 16.0% of acetic acid and 2.0% of pentasodium diethylenetriamine pentaacetate and 655 parts factant solution Brookfield viscosities are shown in Table 1.

TABLE 1
HYDROPHOBICALLY MODIFIED ANIONIC COPOLYMERS

| Examples | AMD[2] (mole %) | LA[3] (mole %) | AA[4] (mole %) | SAPS[5] (mole %) | Viscosity mPa.s[1] Without Surfactant | Viscosity mPa.s[1] With[6] Surfactant |
|---|---|---|---|---|---|---|
| 2 | 79.9 | 0.1 | 20.0 | — | >50 | 4.6 |
| 3 | 80.0 | 0 | 20.0 | — | 5.6 | 5.3 |
| 4 | 89.9 | 0.1 | 10.0 | — | >50 | 5.2 |
| 5 | 90.0 | 0 | 10.0 | — | 5.1 | 4.9 |
| 6 | 69.9 | 0.1 | 30.0 | — | >50 | 5.1 |
| 7 | 70.0 | 0 | 30.0 | — | 5.5 | 5.4 |
| 8 | 59.9 | 0.1 | 40.0 | — | 30 | 4.6 |
| 9 | 60.0 | 0 | 40.0 | — | 4.0 | 3.9 |
| 10 | 89.9 | 0.1 | — | 10.0 | 22 | 4.7 |
| 11 | 90.0 | 0 | — | 10.0 | 6.0 | 5.8 |
| 12 | 79.9 | 0.1 | — | 20.0 | 13.0 | 5.2 |
| 13 | 80.0 | 0 | — | 20.0 | 5.4 | 5.3 |
| 14 | 69.9 | 0.1 | — | 30.0 | 12.5 | 5.6 |
| 15 | 70.0 | 0 | — | 30.0 | 5.5 | 5.3 |
| 16 | 59 | 0.1 | — | 40.0 | 10.6 | 6.2 |
| 17 | 60.0 | 0 | — | 40.0 | 5.3 | 5.0 |

Polymer Concentration = 1000 ppm
(c) comparative
[1]Brookfield Viscosity (60 rpm) at 25° C. in 1M NaCl
[2]Acrylamide
[3]Lauryl Acrylate
[4]Acrylic Acid
[5]Sodium 2-acrylalamido-2-methylpropanesulfonate
[6]Polyoxyethylene ether of lauryl alcohol = 2000 ppm of water is deoxygenated at room temperature by sparging with nitrogen for 1 hour. The solution is then heated to 40° C. and 0.113 part of 2,2′-azobis(2-amidinopropane)hydrochloride catalyst added to initiate polymerization The resulting polymer gel is allowed to exotherm to 59° C. This temperature is maintained for 16 hours. A sample of the gel is then cut into small pieces, ca ⅛″. Polymer gel disperions (0.1%) are prepared in (a) plain water and (b) in 1% surfactant solution (lauryl ether of polyoxyethylene EO=35, HLB=16.9) by adding the required amount of cut gel to a measured volume of stirred aqueous solution. It is found that the polymer does not dissolve to any extent in plain water, even after many days of stirring at room temperature, the polymer remaining as clear gel particles. However, the polymer does dissolve in the surfactant solution, giving a viscous solution (Brookfield viscosity is 3.4 mPa.s, at 25° C., 60 rpm). Addition of 1N NaCl gives a solution with a Brookfield viscosity of 4.0 mPa.s. No insoluble gel particles are observed.

EXAMPLES 2–19

A solution containing 8.98% of acrylamide, 1.01% acrylic acid, 1.0% sodium dodecylsulfate, 0.0227% (0.1 mole % on monomers) of lauryl acrylate, 1.2% acetic acid and 0.02% of pentasodium diethylenetriamine pentaacetate is sparged with nitrogen to <0.3 ppm of residual oxygen. After heating to 42° C., 2,2,′-azobis(-2amidinopropane)hydrochloride catalyst (1550 ppm on monomers) is added to initiate polymerization. After the reaction mixture is allowed to exotherm to 68° C., the gel is placed in an oven at 68° C. for 16 hours. This product is then dissolved in either plain water or surfactant solution as described in Example 1, above. The pH of the final solution is adjusted to 7-8 by addition of sodium hydroxide solution (0.1N).

In Examples 3-19, the above procedure is followed except that the monomers and/or their concentrations are varied to give the results indicated.

All of the polymers described in Examples 2-19 are found to be totally soluble in both plain water and sur-

TABLE 2
EFFECT OF SURFACTANT CONCENTRATION ON SOLUTION VISCOSITY

| Polymer of | Surfactant(ppm)[1] | Viscosity at 25° C. (mPa.s)[2] |
|---|---|---|
| Example 2 | 0 | 11 |
| | 1 | 5 |
| | 10 | 3.6 |
| | 50 | 2.7 |
| | 100 | 2.6 |
| | 200 | 2.6 |
| Example 3 | 0 | 2.7 |
| | 200 | 2.6 |

Polymer Concentration = 500 ppm
[1]Brij 35
[2]Brookfield Viscosity (60 rpm) in 1M NaCl

TABLE 3
HYDROPHOBICALLY MODIFIED CATIONIC COPOLYMER

| Example | AMD | LA | Cationic[3] Monomer | Viscosity mPa.s[1] Without[2] Surfactant | Viscosity mPa.s[1] With Surfactant |
|---|---|---|---|---|---|
| 18 | 79.8 | 0.2 | 20.0 | 165 | 19 |
| 19 | 80.0 | 0 | 20.0 | 13 | 12 |

Polymer Concentration = 2500 ppm
[1]Brookfield Viscosity (3 rpm) at 25° C. in M NaCl
[2]2000 ppm polyoxyethylene ether of lauryl alcohol
[3]Methyl chloride of dimethylaminoethylacrylate, mole %

It is well known that homopolyacrylamide (PAM) is very soluble in water giving viscous solutions. The results described in Example 1 show that hydrophobic modification causes insolubilization of PAM, most probably because intramolecular association of hydrophobic groups causes cross-linking of polymer chains. Hydrophobically modified PAMs would not therefore be useful as thickening agents when used alone. As shown in Example 1, these polymers are however, soluble in aqueous surfactant solution since surfactants tend to associate with the hydrophobic groups thereby destroying the insolubilizing crosslinks. However, the viscosity was found to be quite modest when compared to those obtained with the polymers of this invention—see Table 1, Examples 2,4,6,8,10,12,14,16.

Unexpectedly, it has been found that hydrophobically modified acrylamide terpolymers (HTERPs) containing ionizable groups such as acrylic acid are readily soluble in water containing no added surfactant, resulting in highly viscous aqueous solutions. It has thus been discovered that HTERPs do not require additional surfactant to effect solubility. Furthermore, it has been found that added surfactant has a detrimental effect on the viscosifying power of HTERPs. This is clearly shown in Table 1.

In the absence of added surfactant, the HTERPs are much more effective thickening agents than the unmodified copolymers. In the presence of added surfactant the HTERPS have the same solution viscosity as the umodified copolymers. Table 1 shows that the effect is general for both acrylate and sulfonate containing HTERPs.

By further way of illustration, Table 2 shows that extremely small levels of added surfactant have a detrimental effect on the viscosifying power of HTERPs reducing solution viscosity to the same values as are obtained with unmodified copolymers.

Table 3 shows that cationic HTERPs are also effective thickening agents.

We claim:

1. A water-soluble composition for thickening aqueous liquids consisting essentially of:
   A. a water-soluble thickening agent which agent consists essentially of a water-soluble terpolymer of:
   (a) acrylamide,
   (b) 2-acrylamido-2-methylpropane sulfonic acid salt; acrylic acid; or dimethylaminoethyl acrylate methyl chloride salt; and
   (c) a $C_8$–$C_{20}$ alkyl ester of acrylic acid, and
   B. a water-soluble inorganic salt,
   wherein the molecular weight of the terpolymer is such that, at the same concentration, a copolymer of only components (a) and (c) having the same molecular weight, is water-insoluble, the concentration of monomer (b) being replaced by an equal concentration of acrylamide (a).

2. The composition of claim 1 wherein (b) is acrylic acid and c) is dodecyl acrylate.

3. The composition of claim 1 wherein (b) is 2-acrylamido-2-methylpropane sulfonic acid salt and (c) is dodecyl acrylate.

4. The composition of claim 1 wherein (b) is dimethylaminoethyl acrylate methyl chloride salt and (c) is dodecyl acrylate.

5. The composition of claim 1, wherein the terpolymer has a molecular weight in the range from about 2 to about 20 million.

6. The composition of claim 1 wherein the inorganic salt is a salt of monovalent cation which salt is present in amount from about 0.1 to about 15 weight percent based on the aqueous composition.

7. The composition of claim 6 wherein the salt is sodium chloride or potassium chloride or a mixture thereof.

8. The composition of claim 6 wherein the inorganic salt is a salt of a divalent metal which salt is present in an amount from about 0.01 to about 10 weight percent based on the composition.

9. The composition of claim 8 wherein the divalent metal is calcium, magnesium or a mixture thereof.

* * * * *